(12) United States Patent
Trzupek et al.

(10) Patent No.: US 10,750,326 B2
(45) Date of Patent: *Aug. 18, 2020

(54) METHOD, DEVICE, AND SYSTEM FOR CREATING COMMUNICATION GROUPS

(71) Applicant: MOTOROLA SOLUTIONS, INC., Chicago, IL (US)

(72) Inventors: Dominik Trzupek, Cracow (PL); Lee M. Proctor, Cary, IL (US); Pawel M. Smietana, Cracow (PL); Mariusz R. Wawrowski, Wawrzenczyce (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/061,810

(22) PCT Filed: Dec. 30, 2015

(86) PCT No.: PCT/PL2015/050078
§ 371 (c)(1),
(2) Date: Jun. 13, 2018

(87) PCT Pub. No.: WO2017/116248
PCT Pub. Date: Jul. 6, 2017

(65) Prior Publication Data
US 2018/0359613 A1    Dec. 13, 2018

(51) Int. Cl.
*H04W 4/021* (2018.01)
*H04W 4/08* (2009.01)
(Continued)

(52) U.S. Cl.
CPC ........... *H04W 4/08* (2013.01); *H04W 4/021* (2013.01); *H04W 4/80* (2018.02); *H04W 4/12* (2013.01); *H04W 4/16* (2013.01); *H04W 4/90* (2018.02)

(58) Field of Classification Search
CPC ......... H04W 4/021; H04W 4/08; H04W 4/12; H04W 4/16; H04W 4/80; H04W 4/90
See application file for complete search history.

(56) References Cited

U.S. PATENT DOCUMENTS 8,965,692 B2   2/2015  Chang et al.
9,781,574 B2  10/2017  Wawrowski et al.
(Continued)

OTHER PUBLICATIONS

PCT/PL2015/050077 International Search Report and Written Opinion of the International Searching Authority dated Jun. 13, 2016 (10 pages).

(Continued)

*Primary Examiner* — Dominic E Rego

(57) ABSTRACT

A method, device, and system for creating a communication group among a plurality of mobile communication devices. The method includes creating a first trigger condition, at a first mobile communication device, the first trigger condition including detection of a second mobile communication device in an area. A context data message that includes the first trigger condition and the area definition is sent by the first mobile communication device to a communication beacon having a range that includes the area. When the first trigger condition occurs and when the first mobile communication device is outside the area, receive a group call at the first mobile communication device from the second mobile communication device.

20 Claims, 11 Drawing Sheets

(51) Int. Cl.
*H04W 4/90* (2018.01)
*H04W 76/14* (2018.01)
*H04W 4/80* (2018.01)
*H04W 4/12* (2009.01)
*H04W 4/16* (2009.01)

(56) References Cited

U.S. PATENT DOCUMENTS

| | | | |
|---|---|---|---|
| 2007/0287474 A1 | 12/2007 | Jenkins et al. | |
| 2009/0054084 A1 | 2/2009 | Buhrke et al. | |
| 2010/0296642 A1* | 11/2010 | Hidajat | H04M 1/2473 379/142.06 |
| 2010/0315228 A1* | 12/2010 | Grilliot | G08B 21/04 340/540 |
| 2013/0053011 A1* | 2/2013 | Lee | H04M 1/56 455/415 |
| 2013/0109427 A1 | 5/2013 | Matus | |
| 2013/0208622 A1* | 8/2013 | Ibuki | H04W 84/18 370/254 |
| 2013/0210393 A1 | 8/2013 | Hillier | |
| 2013/0329666 A1* | 12/2013 | Degani | H04W 72/08 370/329 |
| 2014/0243034 A1 | 8/2014 | Gurney et al. | |
| 2015/0029295 A1* | 1/2015 | Gupta | H04M 3/5116 348/14.01 |
| 2015/0056946 A1* | 2/2015 | Leggett | H04W 4/02 455/404.2 |
| 2015/0065177 A1 | 3/2015 | Phillips et al. | |
| 2015/0111524 A1* | 4/2015 | South | H04W 4/90 455/404.2 |
| 2015/0245189 A1* | 8/2015 | Nalluri | G06Q 50/265 455/404.1 |
| 2015/0381802 A1* | 12/2015 | Mendiratta | H04M 3/4217 455/414.1 |

OTHER PUBLICATIONS

PCT/PL2015/050078 International Search Report and Written Opinion of the International Searching Authority dated Jun. 13, 2016 (10 pages).

* cited by examiner

METHOD, DEVICE, AND SYSTEM FOR CREATING COMMUNICATION GROUPS

BACKGROUND OF THE INVENTION

Current mobile communication devices, such as two-way radios, may communicate via communication groups (e.g., talkgroups) for simultaneous communication among multiple mobile communication devices. Communication groups may be established by a network device or by individual mobile communication devices based on the needs of the particular network. In addition, mobile communication devices may be able to set up communication groups with other mobile communication devices that are near to a location. However, mobile communication devices outside of the location may not be included in the communication group. As a consequence, a user of a mobile communication device that subsequently enters the location after previous mobile communication devices have left may not be aware of important information relating to the location.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
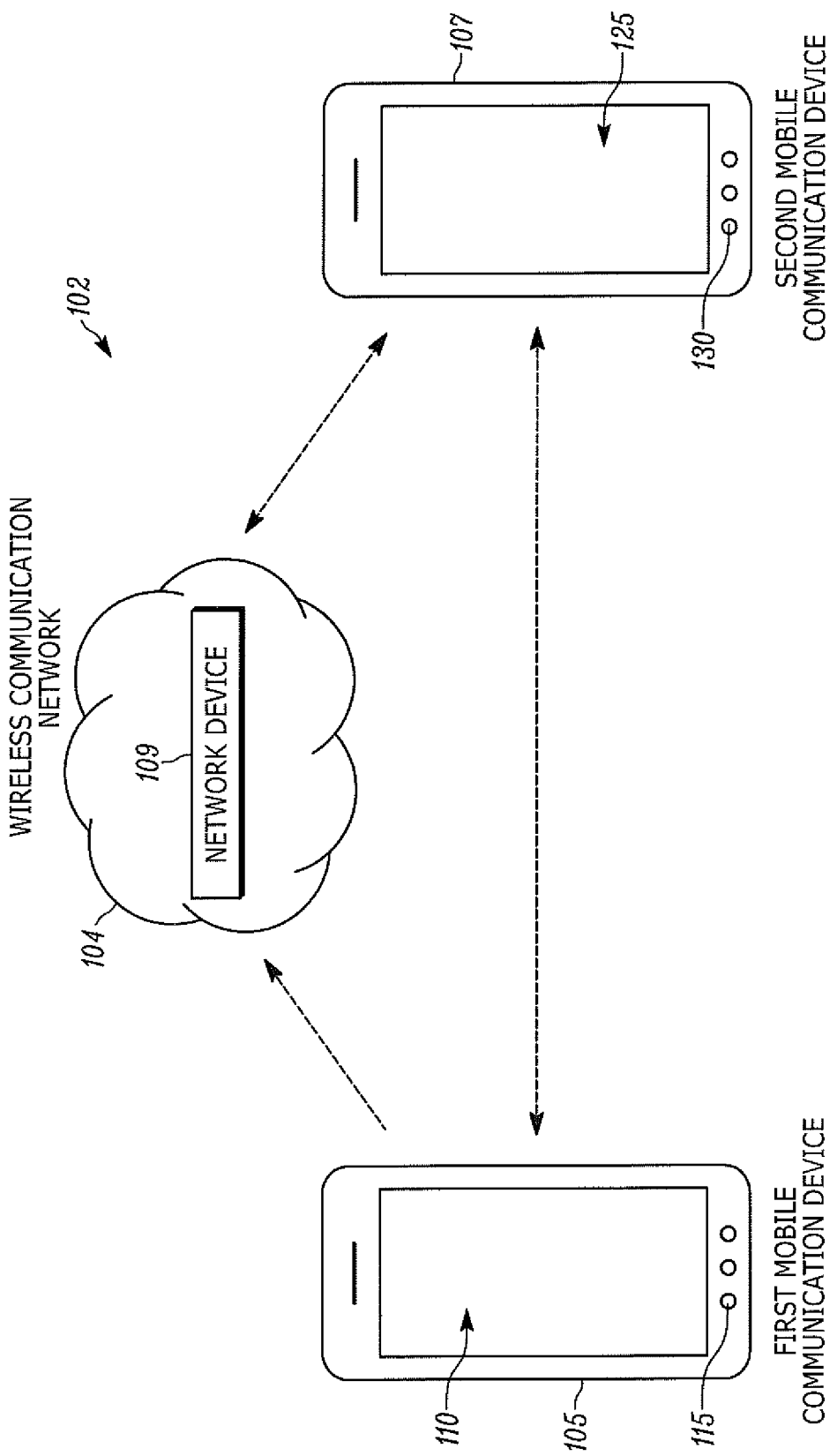
FIG. 1 is a functional block diagram of a first communication network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of creating a communication group among a plurality of mobile communication devices. The method includes creating a first trigger condition at a first mobile communication device. The first trigger condition includes detection of a second mobile communication device in an area defined by an area definition. A context data message is sent from the first mobile communication device to a communication beacon having a range that includes the area definition. The context data message includes the first trigger condition. When the first trigger condition occurs and when the first mobile communication device is outside the area, a group call is received at the first mobile communication device from the second mobile communication device.

Another embodiment provides a first mobile communication device for creating a communication group among a plurality of mobile communication devices. The first mobile communication device includes a graphical user interface, a radio frequency transceiver, and an electronic processor and memory communicatively coupled to the graphical user interface and the radio frequency transceiver. The electronic processor is configured to create a trigger condition that includes detection of a second mobile communication device in an area defined by an area definition. The electronic processor is configured to send a context data message from the first mobile communication device to a communication beacon having a range that includes the area. The context data message includes the trigger condition. When the trigger condition occurs and when the first mobile communication device is outside the area, a group call is received from the second mobile communication device including the first mobile communication device and the second mobile communication device.

Yet another embodiment provides a system for creating a communication group among a plurality of mobile communication devices. The system includes a communication beacon having a range that includes an area. The communication beacon is configured to receive a context data message from a first mobile communication device. The context data message includes a first trigger condition that includes detection of a second mobile communication device within the area. The communication beacon is configured to store the context data message in a memory of the communication beacon and to send a message to the second mobile communication device instructing the second mobile communication device to form a communication group with the first mobile communication device when the first trigger condition occurs.

FIG. 1 illustrates a first communication system 102 including a wireless communication network 104, a first mobile communication device 105, and a second mobile communication device 107. The wireless communication network 104 includes, among other things, a network device 109 (e.g., a network controller). The wireless communication network 104 supports two-way trunked radio and may include base stations, repeaters, site controllers, zone controllers, and the like. The wireless communication network 104 controls and coordinates radio and network traffic between mobile communication devices including controlling and managing talkgroup communication using dedicated control channels. However, in some embodiments, the first mobile communication device 105 and the second mobile communication device 107 communicate with each other independently of the wireless communication network 104.

The first mobile communication device 105 generally may include various types and styles of mobile communication devices including mobile telephones, smart telephones, smart watches, tablet computers, land mobile radios, and the like. The first mobile communication device 105 may operate over various communication channels and networks. For example, the first mobile communication device 105 is configured to communicatively couple to networks other than the wireless communication network 104. For example, the first mobile communication device 105 may communicatively couple to a cellular network, a land mobile radio network, a trunked radio network, a wireless local area network (e.g., Wi-Fi), short range wireless network (e.g., Bluetooth), and the like. In this example illustrated, the first mobile communication device 105 includes a first graphical user interface 110 (e.g., a touchscreen) and a first set of input buttons 115 or other types of mechanical input controls. The first graphical user interface 110 receives input selections and also displays information, links, objects, programs, and the like. The first graphical user interface 110 may display selectable menus, selectable parameters, and blank fields to receive inputs for creating a context data message as described below.

Figure 2:
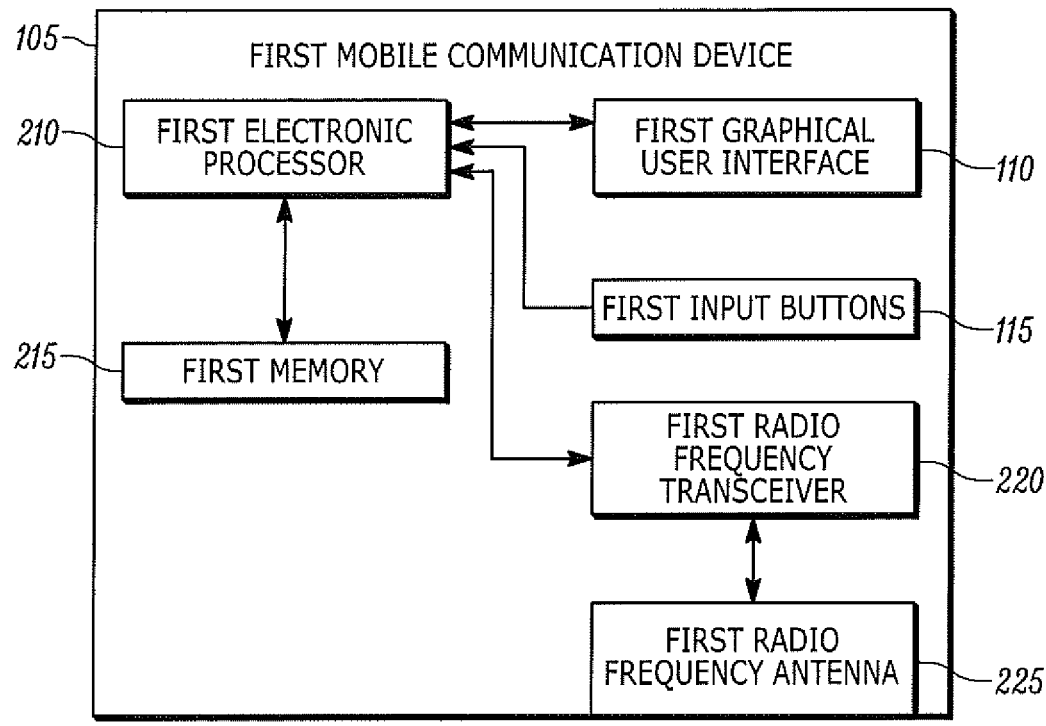
FIG. 2 is a block diagram of a first mobile communication device of the first communication network of FIG. 1 in accordance with some embodiments.

One example configuration of the first mobile communication device 105 is illustrated in FIG. 2. In this example, the first mobile communication device 105 includes a plurality of electrical and electronic components that provide power, operation control, and protection to the components and modules within the first mobile communication device 105. For example, the first mobile communication device 105 includes a first electronic processor 210 (e.g., a programmable electronic microprocessor, microcontroller, or similar device), a first memory 215 (e.g., non-transitory, machine-readable memory), a first radio frequency transceiver 220 (e.g., configured to send and receive data and communications), a first radio frequency antenna 225, the first graphical user interface 110, and the first set of input buttons 115. The first electronic processor 210 is communicatively coupled to the first memory 215 and executes instructions stored on the first memory 215. The first electronic processor 210 is configured to retrieve from the first memory 215 and execute, among other things, instructions related to the control processes and method described herein. In other embodiments, the first mobile communication device 105 includes additional, fewer, or different components.

Figure 3:
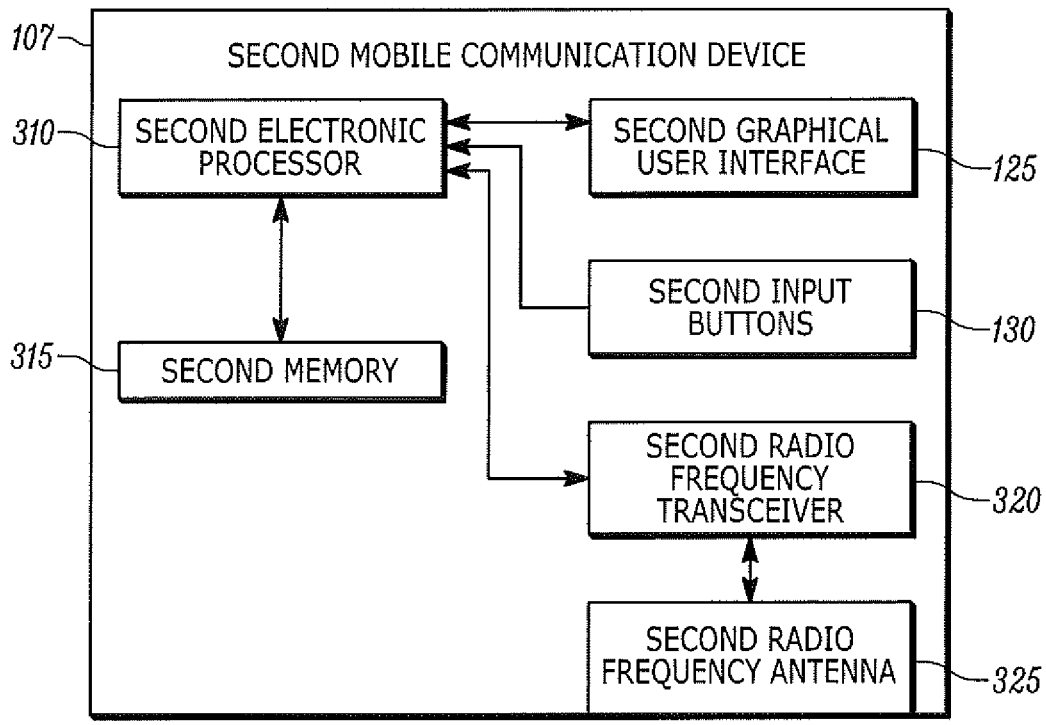
FIG. 3 is a block diagram of a second mobile communication device of the first communication network of FIG. 1 in accordance with some embodiments.

In reference to FIG. 1, the second mobile communication device 107 may include similar components as the first mobile communication device 105, such as, a second graphical user interface 125 (e.g., a touchscreen) and a second set of input buttons 130 or other types of mechanical input controls. One example configuration of the second mobile communication device 107 is illustrated in FIG. 3. In the illustrative example, the second mobile communication device 107 includes a second electronic processor 310 (e.g., a programmable electronic microprocessor, microcontroller, or similar device), a second memory 315 (e.g., non-transitory, machine-readable memory), a second radio frequency transceiver 320 (e.g., configured to send and receive data and communications), a second radio frequency antenna 325, the second graphical user interface 125, and the second set of input buttons 115. The components of the second mobile communication device 107 may provide the same or similar functionality as those previously described in reference to the first mobile communication device 105.

Figure 4:
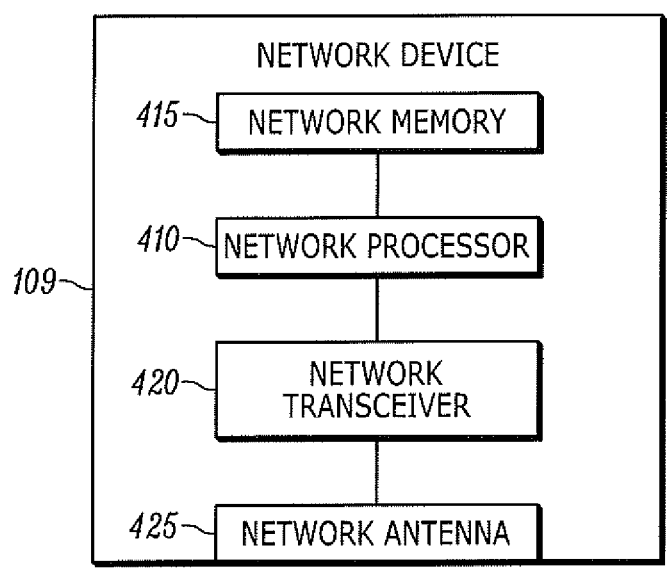
FIG. 4 is a block diagram of a network device of the first communication network of FIG. 1 in accordance with some embodiments.

One example configuration of the network device 109 is illustrated in FIG. 4. In the illustrative example, the network device 109 includes a network processor 410 (e.g., a programmable electronic microprocessor, microcontroller, or similar device), a network memory 415 (e.g., non-transitory, machine-readable memory), and a network transceiver 420. In other embodiments, the network device 109 includes additional, fewer, or different components. The network device 109 may contain, in part, similar electronic and communication components as the mobile communication devices. As a consequence, some aspects of data processing and data handling may be performed by either the network device 109 or the mobile communication devices. The network device 109 is configured to communicatively couple with the first mobile communication device 105 and the second mobile communication device 107. When the first mobile communication device 105 or the second mobile communication device 107 enters within range of the wireless communication network 104, the network device 109 authenticates and registers the mobile communication devices with the wireless communication network 104.

Figure 5:
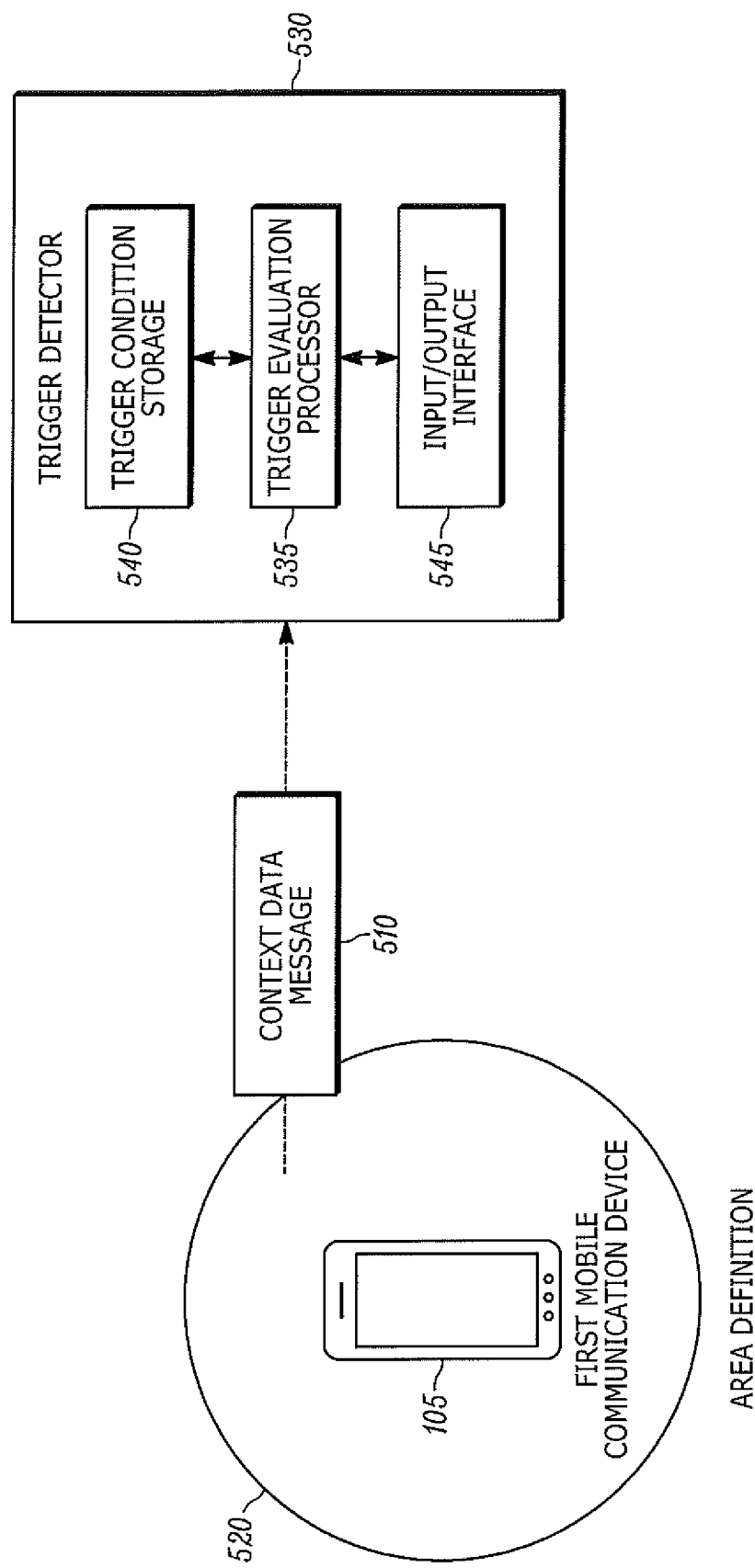
FIG. 5 is a functional block diagram illustrating transmission of a context data message from the first mobile communication device to a trigger detector of the first communication network of FIG. 1 in accordance with some embodiments.

In accordance with some embodiments, the first communication system 102 of FIG. 1 includes a trigger detector. For example, as illustrated in FIG. 5, the first mobile communication device 105, in one embodiment, is communicatively coupled to a trigger detector 530. The trigger detector 530 includes a trigger evaluation processor 535 (e.g., a programmable electronic microprocessor, microcontroller, or similar device), trigger condition storage 540 (e.g., non-transitory, machine-readable memory), and an input/output interface 545 (e.g., configured to send and receive data and communications). The trigger detector 530 may be an independent device communicatively coupled to one or more of the first mobile communication device 105, the second mobile communication device 107, and the network device 109. Alternatively, the trigger detector 530 may be incorporated into the network device 109, the second mobile communication device 107, or both. When the trigger detector 530 is located in the network device 109, the functionality of the trigger detector 530 is performed by the network device 109. Alternatively, when the trigger detector 530 is located in the second mobile communication device 107, the functionality of the trigger detector 530 is performed by the second mobile communication device 107. In another example, both the network device 109 and the second mobile communication device 107 include the trigger detector 530. In such an example, the functionality of the trigger detector 530 may be apportioned between or duplicated by the network device 109 and the second mobile communication device 107.

Transmission of a context data message 510 from the first mobile communication device 105 to the trigger detector 530 is also illustrated in FIG. 5. Generally, the context data message 510 includes information sent within the first communication system 102 that enables formation of communication groups (e.g., talkgroups) between mobile communication devices. The formation of the communication groups occurs after generation of the context data message 510. For example, the context data message 510 enables the first mobile communication device 105 to form communication groups with not yet identified mobile communication devices based on the occurrence of certain future events in an area defined by an area definition 520. In this way, the context data message 510 acts as a localized annotation defining communication group formation in a particular area for a particular event. The context data message 510 includes the area definition 520, one or more connection parameters, one or more trigger conditions, and scheduling parameters as discussed in detail below.

The context data message 510 is generated by the first mobile communication device 105. The context data message 510 is at least partially defined via selections received by the first mobile communication device 105. For example, selections may include entries received on the first graphical user interface 110 and entries received on the set of input buttons 115. The selections received by the first mobile communication device 105 may create the area definition 520 and a duration defining when the context data message 510 is active. In addition to the duration, the context data message 510 may include graphical user interface-selected scheduling information indicating active time periods and inactive time periods for the context data message 510. The first graphical user interface 110 may display selectable menus, selectable parameters, and blank fields to receive the selections for defining information carried within the context data message 510. In addition, the first mobile communication device 105 may automatically generate information of the context data message 510 based on instructions stored in the first memory 215. Some of the information may be provided by predefined defaults stored within the first memory 215. Other information may be provided automatically by the first mobile communication device 105, such as, for example, a current location, a device identification, communication group information, and the like. This information may be automatically appended to the context data message 510.

The connection parameters are also included in the context data message 510. The connection parameters guide subsequent formation of the communication group for the wireless communication network 104. The connection parameters include device parameters associated with the first mobile communication device 105, device parameters associated with other mobile communication devices (not shown), and, in some embodiments, talkgroup identification indicating the mobile communication devices connected in a talkgroup with the first mobile communication device 105 during creation of the context data message 510. The device parameters of the first mobile communication device 105 may include a unique device identification (e.g., a subscriber ID number), an identification of a current user (e.g., a user profile), a location of the first mobile communication device 105 (e.g., global positioning system (GPS) coordinates), and the like. Similarly, the device parameters of each of the other mobile communication devices may include a unique device identification (e.g., a subscriber ID number), an identification of a current user (e.g., a user profile), a location of the other mobile communication devices (e.g., global positioning system (GPS) coordinates), and the like. The device parameters associated with other mobile communication devices identify mobile communication devices that are to be included in the subsequent formation of the communication group. The device parameters may include identification of one or more particular, known mobile communication devices, but may also define not-yet-identified mobile communication devices to be included in the subsequent formation of the communication group. For example, even though specific device identification of subsequent mobile communication devices is unknown, the device parameters may identify categories of other mobile communication devices to be connected. Such as mobile communication devices associated with one or more of emergency responders, police officers, government agencies, and the like.

The context data message 510 also includes one or more trigger conditions. Each trigger condition identifies one or more potential actions performed by one or more mobile communication devices in the area defined by the area definition (i.e., the defined area) over the duration of the context data message. Once a trigger condition is satisfied (i.e., the identified actions occur), a communication group is formed in accordance with the connection parameters associated with the satisfied trigger condition. The communication group includes the first mobile communication device 105 (i.e., the mobile communication device that originated the context data message 510), the second mobile communication device 107 (i.e., the mobile communication device that triggered the trigger condition), and other mobile communication devices that are defined by the connection parameters.

Once the area definition 520, the scheduling information, the connection parameters, and the trigger condition(s) are defined, and in some embodiments, upon receipt of a send instruction (e.g., by depression of one of the set of input buttons 115), the first mobile communication device 105 sends the context data message 510 to the trigger detector 530. The trigger detector 530 receives the context data message 510 and stores the context data message 510 in trigger condition storage 540. The trigger evaluation processor 535 receives pertinent data from the network device 109, the second mobile communication device 107, and other sources via the input/output interface 545 such that the trigger evaluation processor 535 is able to detect the occurrence of the trigger condition. Once one of the trigger conditions occur, the trigger evaluation processor 535 sends instructions to the second mobile communication device 107 or to the network device 109 to form the communication group.

Figure 6:
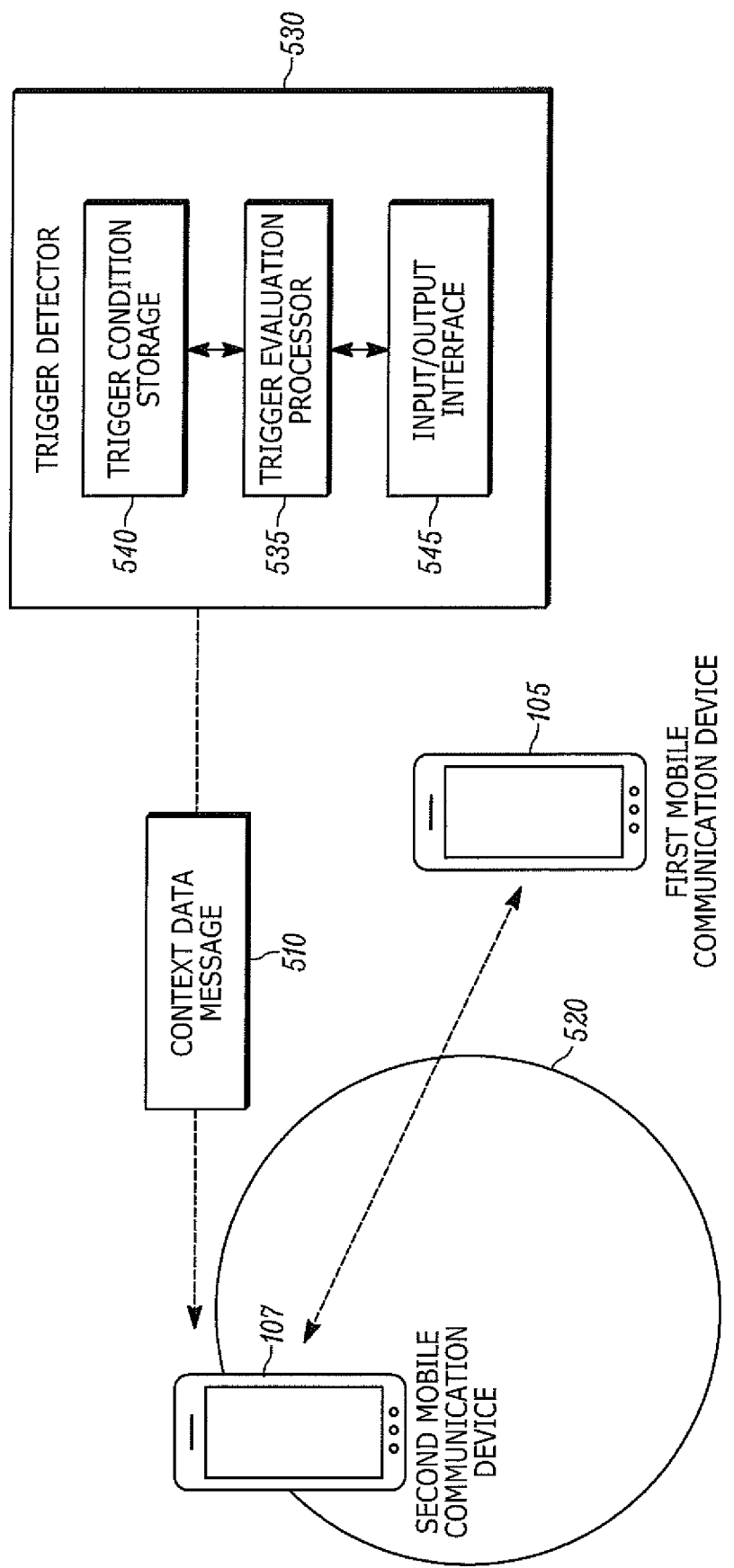
FIG. 6 is a functional block diagram illustrating subsequent reception of the context data message at the second mobile communication device from the trigger detector of FIG. 5 in accordance with some embodiments.

Various types of trigger conditions may be specified in the context data message 510. The trigger conditions are specified in terms of actions that are to occur to satisfy a particular trigger condition. For example, one trigger condition may be satisfied when a mobile communication device of a specified type (e.g., identified by the device parameters described above) enters the defined area as illustrated in FIG. 6. As a particular example, such a trigger condition may be satisfied when a mobile communication device with a user profile associated with a predetermined group of emergency responders (e.g., fire, rescue, or medical responders) enters the defined area. As another example, a trigger condition may be satisfied when the user profile meets specified criteria (e.g., an authorization level) or indicates that certain equipment may be present (e.g., head-mounted display, land mobile radio, police canine unit (K-9 unit), forensic kit, and the like).

In another example, a trigger condition may be satisfied when a mobile communication device is authenticated by or registers with the wireless communication network 104 while within the defined area. In yet another example, a trigger condition may be satisfied when a mobile communication device sends a communication (e.g., a cellular telephone call, a two-way radio transmission, or a text/data message) while in the defined area. For example, when a mobile communication device initiates a call to an emergency service provider while inside the defined area, the trigger condition may be satisfied. In still yet another example, a trigger condition may be satisfied when a mobile communication device has capabilities specified by the first mobile communication device 105 (e.g., broadband capability, specific sensors, certain applications installed, and the like).

In some embodiments, the context data message 510 also includes a message for the second mobile communication device 107. For example, the message may include a pre-recorded audio message, a text/data message, or the like. In these embodiments, the message is delivered upon occurrence of one of the trigger conditions. This message may carry information relevant to a particular type of user profile entering the defined area, such as a police officer. The message may include warnings, instructions, descriptions of the defined area, and the like.

Figure 7:
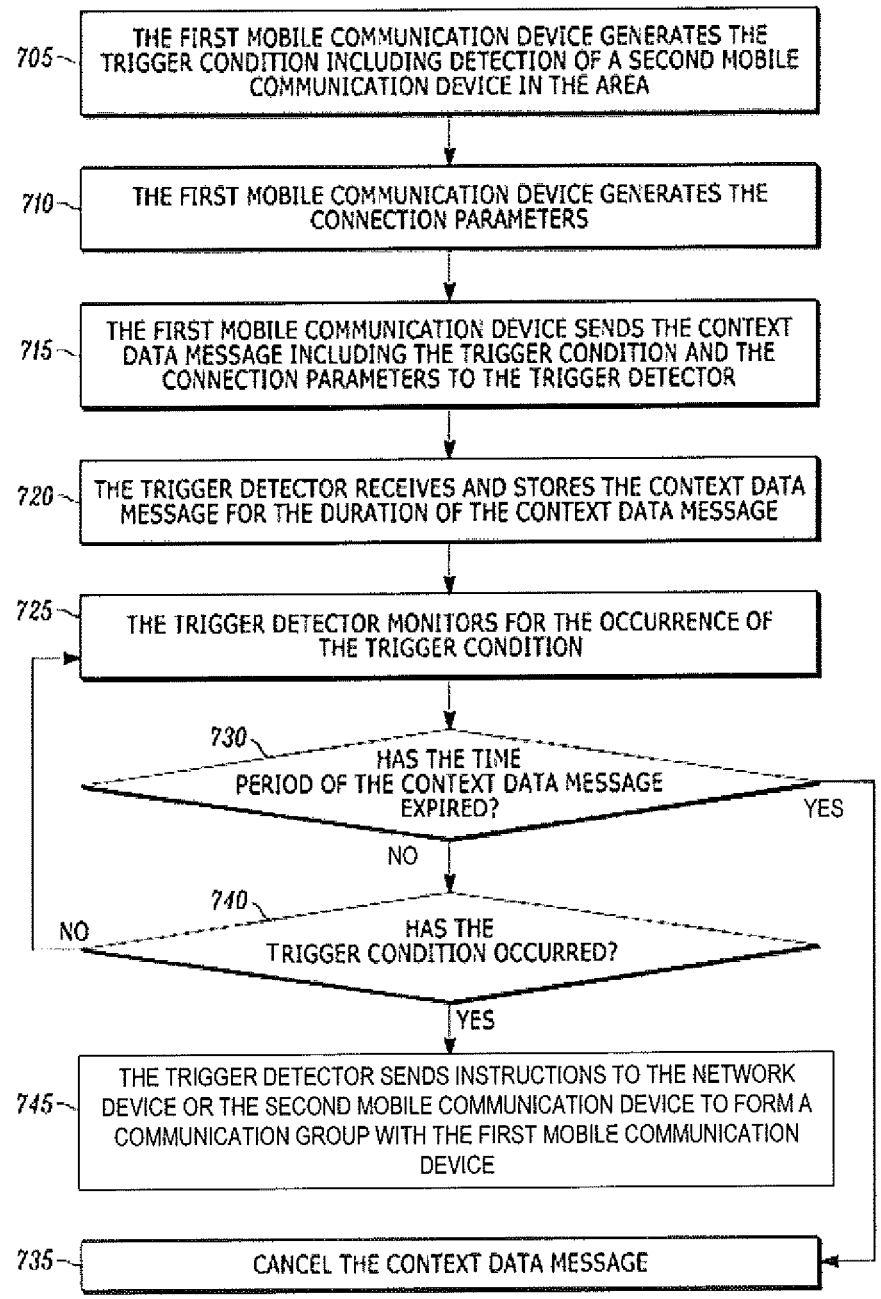
FIG. 7 is a flowchart of a method of forming a communication group between the first mobile communication device and the second mobile communication device of FIGS. 5 and 6 based on the context data message in accordance with some embodiments.

FIG. 7 is a flowchart of an exemplary method 700 of forming a communication group via the trigger detector 530, the first mobile communication device 105, and the second mobile communication device 107. The first mobile communication device 105 generates at least one trigger condition including a trigger condition that includes detection of a second mobile communication device 107 in the area (block 705). The first mobile communication device 105 generates connection parameters (block 710). As noted above, connection parameters include device parameters and guide subsequent formation of a communication group. At block 715, and also with reference to FIG. 5, the first mobile communication device 105 sends the context data message 510 including the trigger condition and the connection parameters to the trigger detector 530.

The trigger detector 530 receives and stores the context data message 510 for a duration of the context data message 510 (block 720), which may be specified by the first mobile communication device 105. The trigger detector 530 monitors for the occurrence of the trigger condition (block 725). For example, the trigger evaluation processor 535 receives data from one or more sources (e.g., mobile communication devices and the network device 109) and compares the data to the trigger conditions. In block 730, the trigger detector 530 determines whether the duration of the context data message 510 has expired. When the duration of the context data message 510 has expired, the trigger detector 530 cancels the context data message 510 (block 735). However, in some embodiments, no duration is set for the context data message 510. As a consequence, the trigger detector 530 may set a predetermined maximum duration to the context data message 510 or may keep the context data message 510 indefinitely. When the duration has not expired, the trigger detector 530 determines whether the trigger condition has occurred (block 740). When the trigger condition occurs, the trigger detector 530 generates and sends instructions to form a communication group including the first mobile communication device 105 (block 745). The communication group is formed in accordance with the connection parameters. When the trigger condition has not yet occurred, the trigger detector 530 continues to monitor for the occurrence of the trigger condition (block 725).

In some embodiments, in block 745, the trigger detector 530 sends instructions to the network device 109 to form the communication group including the first mobile communication device 105 and the second mobile communication device 107. In such an embodiment, the network device 109 initiates an infrastructure-initiated group call to the first mobile communication device 105 and the second mobile communication device 107 based on the instructions from the trigger detector 530. In other embodiments, in block 745, the trigger detector 530 sends instructions to the second mobile communication device 107 to form the communication group with the first mobile communication device 105 by sending a group call initiated by the second mobile communication device 107. In such an example, the trigger detector 530 may send the instructions via a network control channel to the second mobile communication device 107.

Figure 8:
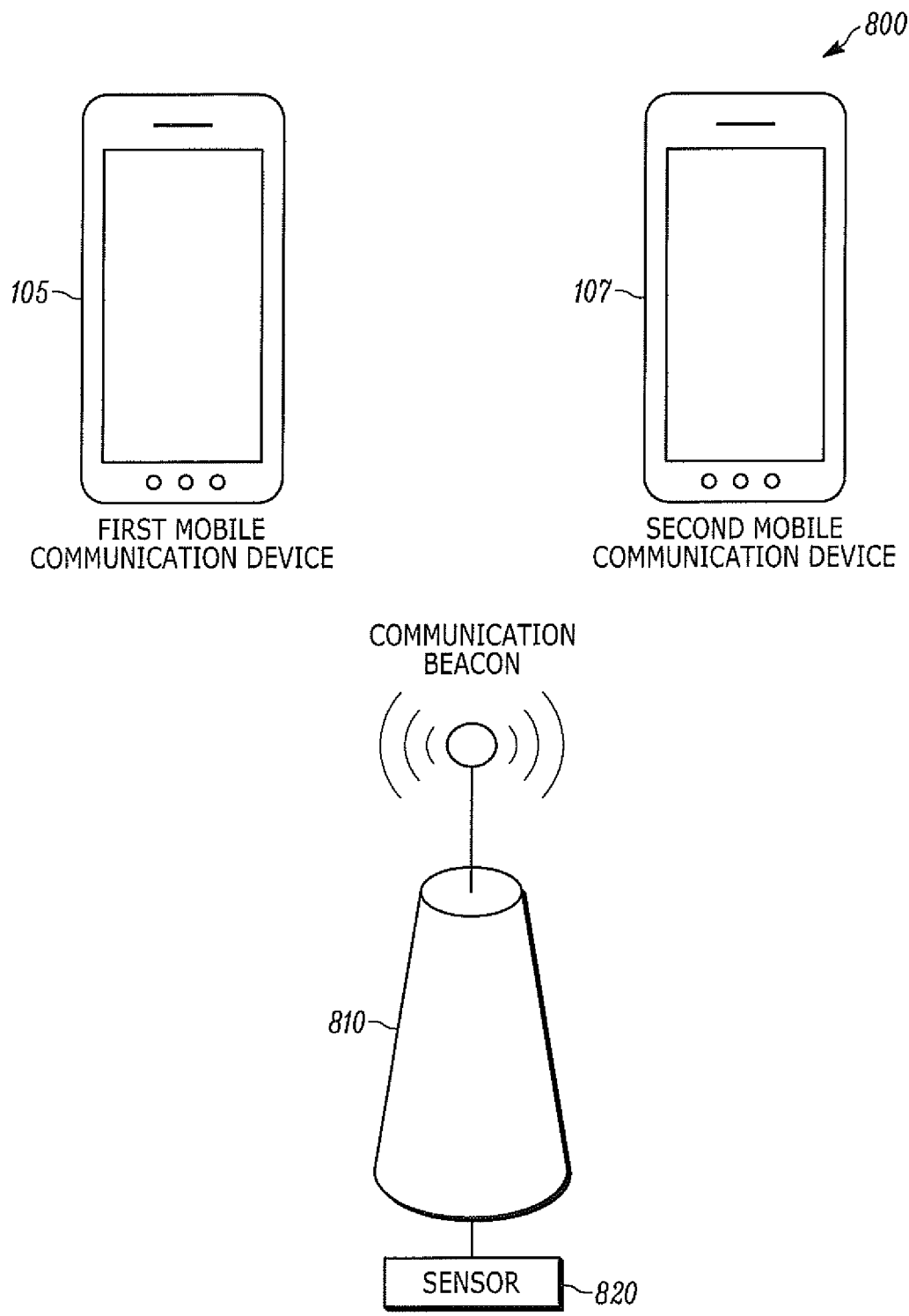
FIG. 8 is a functional block diagram of a second communication network including a communication beacon in accordance with some embodiments.

FIG. 8 illustrates an embodiment of a second communication system 800 including the first mobile communication device 105, the second mobile communication device 107, and a communication beacon 810. The communication beacon 810 is configured to directly communicate with the first mobile communication device 105 and the second mobile communication device 107 via short-range communication (e.g., low energy Bluetooth® or local area network). The communication beacon 810 may also communicate via a wired connection with the first mobile communication device 105. The communication beacon 810 may be one of a variety of different types of communication devices. For example, the communication beacon 810 may be a portable transmitter dedicated to localized transmission of a beacon signal. In such an embodiment, the communication beacon 810 may broadcast instructions via the beacon signal to nearby mobile communication devices. The communication beacon 810 may be communicatively coupled to a sensor 820. The sensor 820 is configured to sense a hazardous condition (e.g., amounts of hazardous substances) located near the communication beacon 810. For example, the sensor 820 may detect a fire hazard, a chemical hazard, a biological hazard, a radiological hazard, a nuclear hazard, or some combination thereof. When the sensor 820 detects a hazardous condition, the sensor 820 sends a condition signal to the communication beacon 810 indicative of the hazardous condition.

Figure 9:
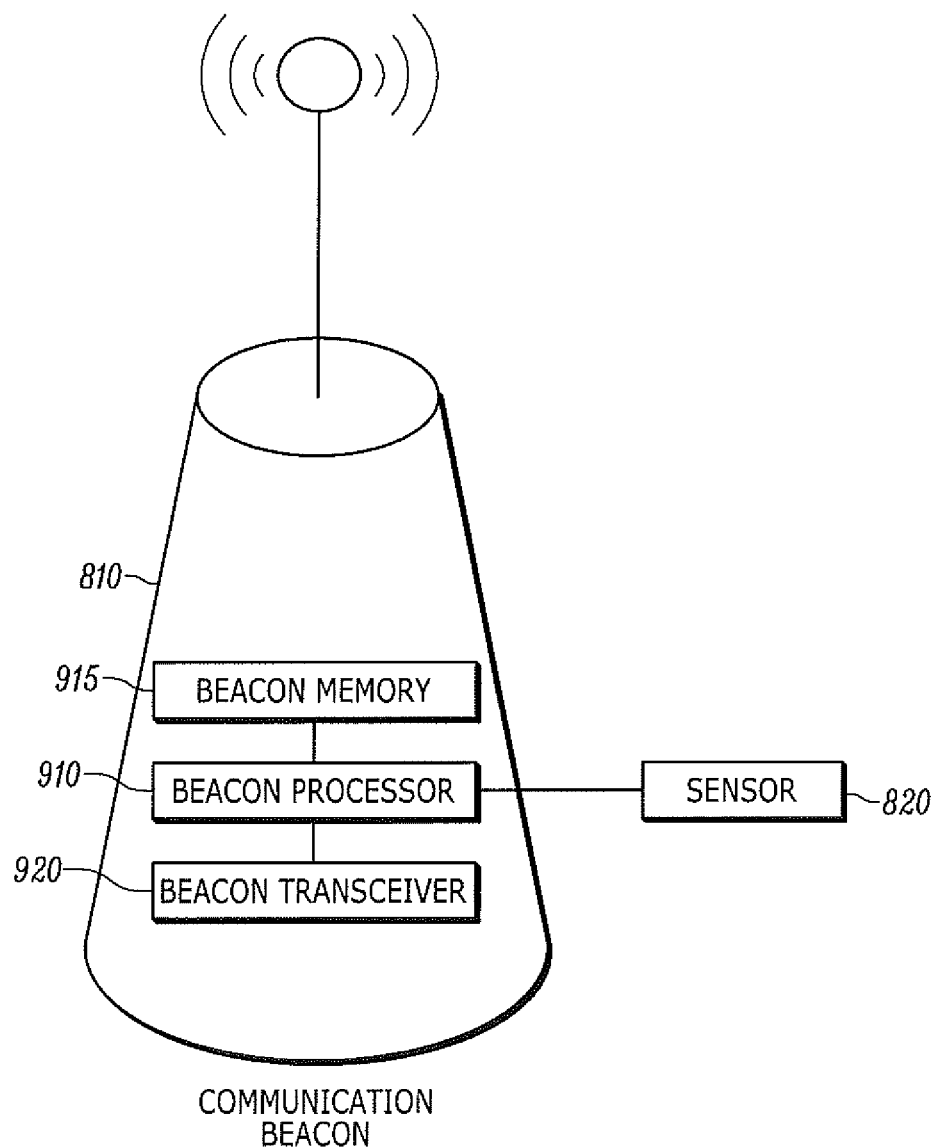
FIG. 9 is a block diagram of a communication beacon of the second communication network of FIG. 8 in accordance with some embodiments.

FIG. 9 illustrates one example of electronic and communication components of the communication beacon 810. These components may include similar electronic and communication components as the first mobile communication device 105 and the second mobile communication device 107. In particular, the communication beacon 810 may have a beacon processor 910, a beacon memory 915, and a beacon transceiver 920. The communication beacon 810 may store the context data message 510 including the trigger condition and the connection parameters to the beacon memory 915. In some embodiments, the beacon processor 910 is communicatively coupled to the sensor 820 and configured to receive the condition signal. The beacon processor 910 may determine when the trigger condition occurs based on the condition signal.

Figure 10:
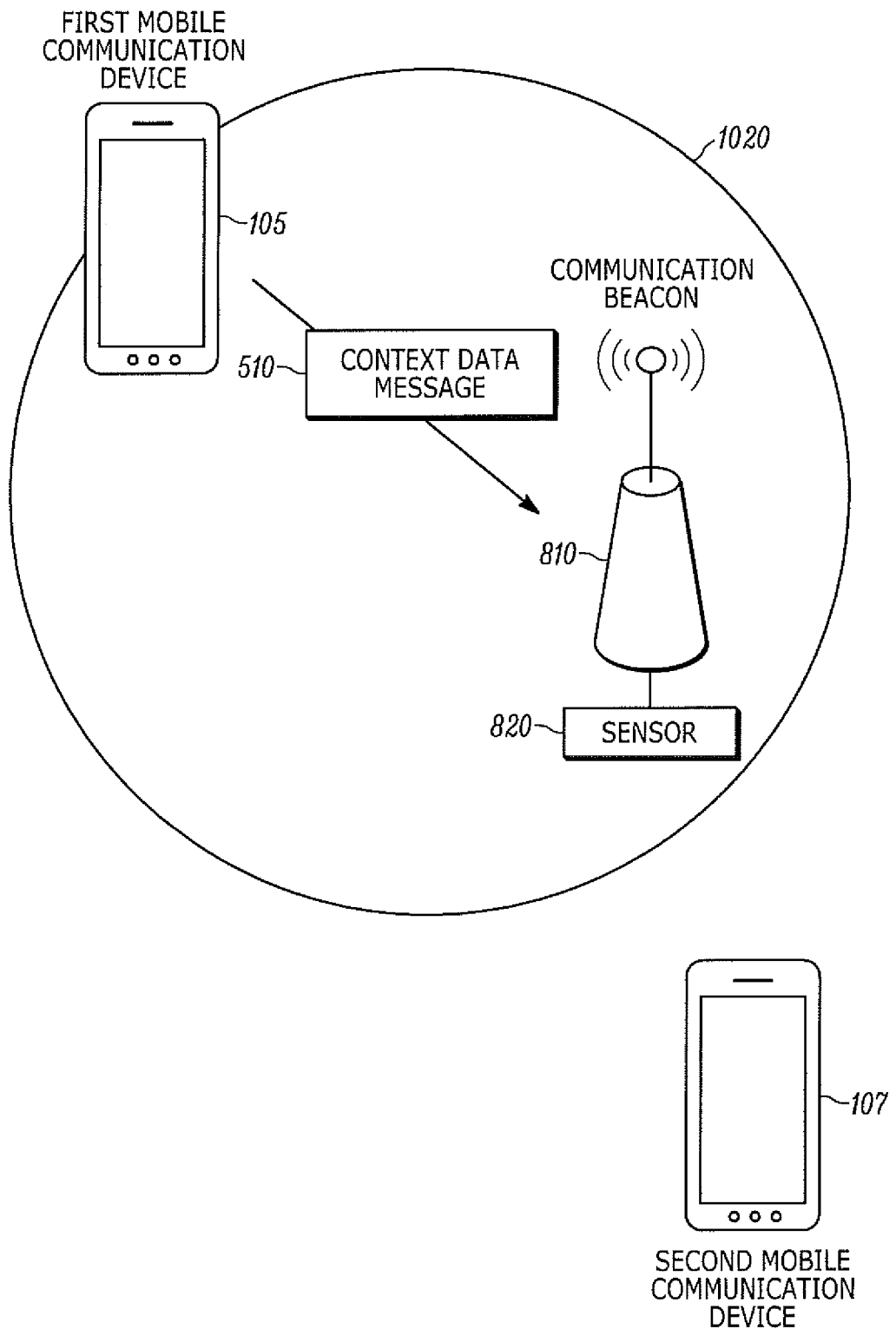
FIG. 10 is a block diagram illustrating transmission of the context data message from the first mobile communication device to the communication beacon of FIGS. 8 and 9 in accordance with some embodiments

As illustrated in FIG. 10, the communication beacon 810 may be positioned within a beacon area defined by a beacon area definition 1020 (i.e., the defined area). The beacon area definition 1020 defines a range that the context data message 510 is active (e.g., the trigger conditions from the context data message 510 only apply within the defined area). The beacon area definition 1020 may be limited to or defined by a maximum communication range of the communication beacon 810 or may be specified as another range.

Figure 11:
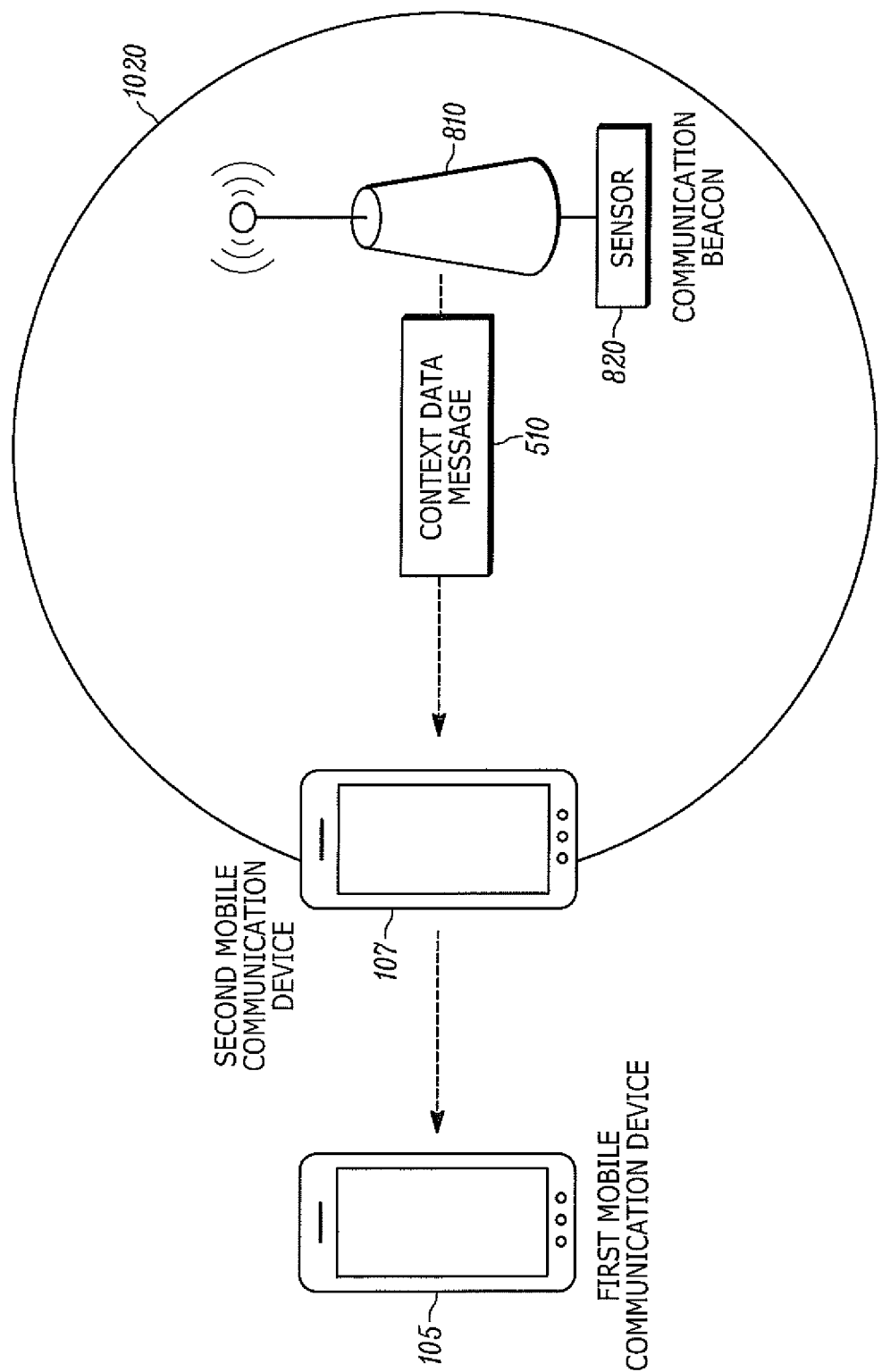
FIG. 11 is a block diagram illustrating subsequent reception of the context data message at the second mobile communication device from the communication beacon of FIGS. 8 and 9 in accordance with some embodiments.

As illustrated in FIG. 11, when the second mobile communication device 107 enters the defined area, the communication beacon 810 forms a communication link with the second mobile communication device 107. For example, the communication beacon 810 may connect to the second mobile communication device 107 via a local area network or Bluetooth®. Alternatively, the communication beacon 810 may periodically broadcast the beacon signal without first determining that the second mobile communication device 107 has entered the defined area. In this example, the second mobile communication device 107 receives the beacon signal, which includes the context data message 510, when it comes within communication range of the communication beacon 810.

Figure 12:
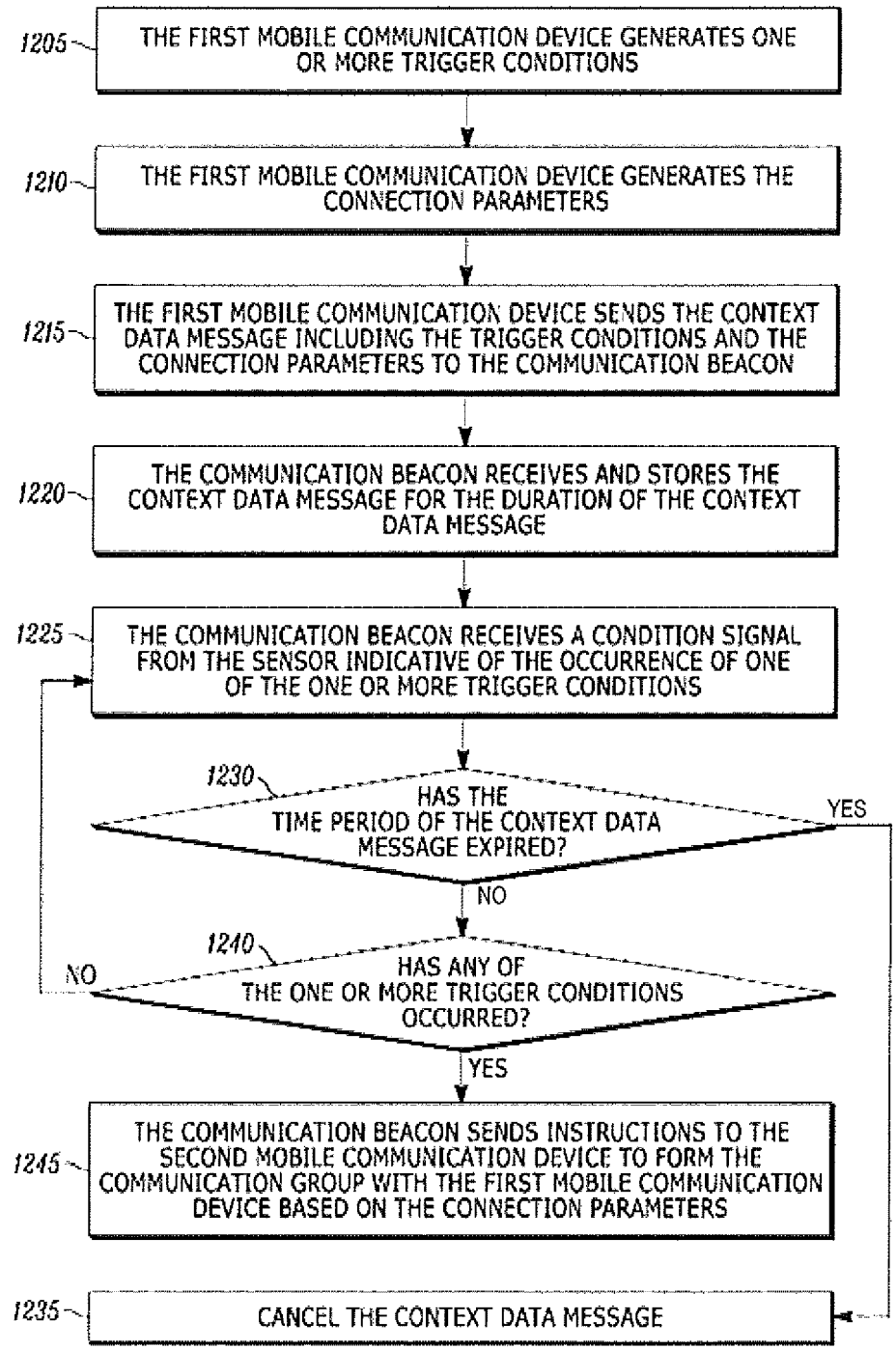
FIG. 12 is a flowchart of a method of forming a communication group based on a context data message sent by the mobile communication device of FIG. 1 to a communication beacon in accordance with some embodiments.

FIG. 12 is a flowchart of an exemplary method of forming a communication group via the communication beacon 810. The first mobile communication device 105 generates one or more trigger conditions (block 1205). For example, the first mobile communication device 105 may generate a trigger condition that is satisfied upon detection of the second mobile communication device 107 in the beacon area definition 1020. The first mobile communication device 105 also generates the connection parameters associated with the one or more trigger conditions (block 1210). The first mobile communication device 105 sends the context data message 510 including the trigger condition(s) and the connection parameters to the communication beacon 810 (block 1215). The communication beacon 810 receives and stores the context data message 510 for the duration of the context data message (block 1220). The communication beacon 810 receives a condition signal from the sensor 820 indicative of the occurrence of one of the one or more trigger conditions (block 1225). For example, the communication beacon 810 may be programmed with a trigger condition that includes detection of a predetermined amount of a hazardous chemical in the defined area.

At block 1230, the communication beacon 810 determines whether the duration of the context data message 510 has expired. When the duration of the context data message 510 has expired, the communication beacon 810 cancels the context data message 510 (block 1235). However, in some embodiments, no duration is set for the context data message 510. As a consequence, the communication beacon 810 may set a predetermined maximum duration to the context data message 510 or may keep the context data message 510 indefinitely. At block 1240, the communication beacon 810 determines whether the trigger condition has occurred. When the trigger condition has not yet occurred, the communication beacon 810 continues to monitor for the occurrence of one of the one or more trigger conditions (block 1225). Conversely, when the trigger condition occurs, the communication beacon 810 sends instructions to the second mobile communication device 107 to form the communication group with the first mobile communication device 105 based on the connection parameters (block 1245). The second mobile communication device 107 may then form the communication group by initiating a group call to the first mobile communication device 105.

In some embodiments, instead of the communication beacon 810 determining whether any of the one or more trigger conditions have occurred (e.g., in block 1240), the communication beacon 810 broadcasts the context data message 510. In this case, the second mobile communication device 107 determines whether any of the one or more trigger conditions have occurred. When the second mobile communication device 107 determines that the trigger condition is satisfied, the second mobile communication device 107 forms the communication group with the first mobile communication device 105 and other mobile communication devices included in the connection parameters. For example, receiving the context data message 510 at the second mobile communication device 107 may satisfy the trigger condition of detecting a mobile communication device within the beacon area definition 1020. In another example, the second mobile communication device 107 determines that the trigger condition of sending a message by a mobile communication device in the beacon area definition 1020 is satisfied when the second mobile communication device 107 sends a message.

In some or all of the embodiments, the first mobile communication device 105 may only receive the group call when the first mobile communication device 105 is outside of the defined area (e.g., defined by the area definition 520 or the beacon area definition 1020). For example, the context data message 510 may only become active when the first mobile communication device 105 exits the defined area. In this example, transmission of the context data message 510 from the first mobile communication device 105 may be delayed until the first mobile communication device 105 exits the defined area. In other embodiments, one of the one or more trigger conditions may include a trigger condition that is satisfied only when the first mobile communication device 105 is outside the defined area. In some instances, this may prevent undesired, immediate formation of the communication group by a mobile communication device that is already present in the defined area.

In some or all of the embodiments, the first mobile communication device 105 may receive a message indicating that the trigger condition has occurred. This message may include information about the mobile communication device that triggered the trigger condition. For example, the first mobile communication device 105 may receive a unique device identification of the second mobile communication device 107 (e.g., a subscriber ID), a description of a user profile associated with the second mobile communication device 107, the location of the second mobile communication device 107, a time that the trigger condition occurred, and the like. As a consequence, the first mobile communication device 105 is informed of the subsequent activity in the defined area and thus, a user of the first mobile communication device 105 may respond with information important to a user of the second mobile communication device 107.

The second mobile communication device 107 may append additional context data messages to the context data message 510. In such an example, the trigger detector 530 or the communication beacon 810 receives the appended context data message and handles the appended context data message in the same manner as the context data message 510. For example, the appended context data message may include separate or additional trigger conditions and connection parameters. The appended context data message may also include additional messages for subsequent mobile communication devices that enter the defined area. As a consequence, subsequent communication among a plurality of mobile communication devices included in the connection parameters may include updated messages regarding the defined area.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of creating a communication group among a plurality of mobile communication devices, the method comprising:
   creating a first trigger condition, at a first mobile communication device, the first trigger condition including detection of a second mobile communication device in an area;
   sending a context data message from the first mobile communication device to a communication beacon having a range that includes the area, the context data message including the first trigger condition;
   when the first trigger condition occurs and when the first mobile communication device is outside the area, receive a group call at the first mobile communication device from the second mobile communication device.

2. The method of claim 1, the method further comprising:
   receiving, at the first mobile communication device, a graphical user interface- selected group of mobile communication devices to be joined to the communication group when the first trigger condition occurs, and
   sending the graphical user interface-selected group of mobile communication devices as connection parameters to the communication beacon.

3. The method of claim 2, further comprising receiving a message at the first mobile communication device from the second mobile communication device when the first trigger condition occurs, the message including an identifier of the second mobile communication device and the connection parameters.

4. The method of claim 1, the method further comprising:
   generating, at the first mobile communication device, a selected group of mobile communication devices to be joined to the communication group when the first trigger condition occurs, the selected group of mobile communication devices being in a talkgroup with the first mobile communication device when the context data message is sent, and sending the selected group of mobile communication devices as connection parameters to the communication beacon.

5. The method of claim 1, further comprising creating a second trigger condition that includes initiation of a call from the second mobile communication device, and wherein sending the context data message from the first mobile communication device to the communication beacon includes sending the second trigger condition.

6. The method of claim 1, further comprising creating a third trigger condition that includes initiation of a call from the second mobile communication device to an emergency service, and wherein sending the context data message from the first mobile communication device to the communication beacon includes sending the third trigger condition.

7. The method of claim 1, further comprising creating a fourth trigger condition that includes a hazardous condition within the area, wherein sending the context data message from the first mobile communication device to the communication beacon includes sending the fourth trigger condition, and detecting the hazardous condition with a sensor communicatively coupled to the communication beacon.

8. The method of claim 1, further comprising creating a fifth trigger condition that includes detection of a predetermined group identifier, the predetermined group identifier identifying the second mobile communication device as associated with a predetermined group of emergency responders, and wherein sending the context data message from the first mobile communication device to the communication beacon includes sending the fifth trigger condition.

9. The method of claim 1, wherein the area is based on a location of the communication beacon and a graphical user interface-selected range included in the context data message.

10. The method of claim 1, wherein the context data message includes graphical user interface-selected scheduling information indicating active time periods that the method of creating the communication group is active and inactive time periods when the method of creating the communication group is inactive.

11. A first mobile communication device for creating a communication group among a plurality of mobile communication devices, the first mobile communication device comprising:
a user interface;
a radio frequency transceiver; and
a controller including an electronic processor and memory, the controller configured to
create a trigger condition that includes detection of a second mobile communication device in an area;
send a context data message from the first mobile communication device to a communication beacon having a range that includes the area, the context data message including the trigger condition;
when the trigger condition occurs and when the first mobile communication device is outside the area, receive a group call from the second mobile communication device, including the first mobile communication device and the second mobile communication device.

12. A system for creating a communication group among a plurality of mobile communication devices, the system comprising:
a communication beacon having a range that includes an area, the communication beacon configured to
receive a context data message from a first mobile communication device, the context data message including a first trigger condition that includes detection of a second mobile communication device within the area,
store the context data message in a memory of the communication beacon, and
send a message to the second mobile communication device instructing the second mobile communication device to form a communication group with the first mobile communication device when the first trigger condition occurs.

13. The system of claim 12, wherein the communication beacon is further configured to send a prerecorded message to the second mobile communication device when the first trigger condition has occurred, the prerecorded message created by the first mobile communication device.

14. The system of claim 12, wherein the context data message includes connection parameters that define a graphical user interface-selected group of mobile communication devices to be joined to the communication group when the first trigger condition occurs.

15. The system of claim 12, wherein the context data message includes connection parameters that define a group of mobile communication devices to be joined to the communication group when the first trigger condition occurs, the communication group being mobile communication devices that were in a previous communication group with the first mobile communication device when the context data message was sent.

16. The system of claim 12, wherein the context data message includes a second trigger condition that includes an outgoing call from the second mobile communication device.

17. The system of claim 12, further comprising a sensor communicatively coupled to the communication beacon, and wherein the context data message includes a third trigger condition that includes receiving a condition signal from the sensor.

18. The system of claim 17, wherein the condition signal indicates at least one from a group consisting of fire hazard, chemical hazard, biological hazard, radiological hazard, and nuclear hazard.

19. The system of claim 12, wherein the context data message includes a fourth trigger condition that includes detection of a predetermined group identifier, the predetermined group identifier identifying the second mobile communication device as associated with a predetermined group of emergency responders.

20. The system of claim 12, wherein the communication beacon is configured to communicate with the first mobile communication device and the second mobile communication device using short-range communication.

* * * * *